US005636308A

United States Patent [19]
Personne et al.

[11] Patent Number: 5,636,308
[45] Date of Patent: Jun. 3, 1997

[54] EASY AND QUICK STRIPPING OPTICAL-FIBER CABLE, AND A METHOD OF MANUFACTURING SUCH A CABLE

[75] Inventors: Jacques Personne, Conflans Ste Honorine; Pierre Gaillard, Cergy; Laurent Sevoz, Saint Denis; Michel Lambert, Argenteuil, all of France

[73] Assignee: Alcatel Cable, Clichy Cedex, France

[21] Appl. No.: 579,409

[22] Filed: Dec. 27, 1995

[30] Foreign Application Priority Data

Jan. 2, 1995 [FR] France ................. 95 00010

[51] Int. Cl.⁶ ........................................ G02B 6/44
[52] U.S. Cl. ........................................ 385/102
[58] Field of Search ........................... 385/100–103, 385/147

[56] References Cited

U.S. PATENT DOCUMENTS

| | | | |
|---|---|---|---|
| 4,009,932 | 3/1977 | Ferrentino | 385/102 |
| 4,188,088 | 2/1980 | Anderson et al. | 385/102 |
| 4,239,335 | 12/1980 | Stiles | 385/102 |
| 4,401,361 | 8/1983 | Slaughter | 385/102 X |
| 4,761,053 | 8/1988 | Cogelia et al. | 385/102 X |

FOREIGN PATENT DOCUMENTS

| | | |
|---|---|---|
| 2481812 | 11/1981 | France . |
| 2517074 | 5/1983 | France . |
| 2633402A1 | 12/1989 | France . |
| 3219455A1 | 11/1983 | Germany . |
| 4306190A1 | 9/1994 | Germany . |
| 4306190 | 9/1994 | Germany ................. 385/102 |
| 2163895 | 3/1986 | United Kingdom . |
| WO9101014 | 1/1991 | WIPO . |
| 9101014 | 1/1991 | WIPO ................. 385/102 |

OTHER PUBLICATIONS

*Patent Abstracts of Japan*, vol. 007, No. 2909 (P–245), Dec. 24, 1983 corresponding to JP-A-58 162910 (Furukawa Denki Kogyo KK) Sep. 27, 1983.

*Primary Examiner*—Akm E. Ullah
*Attorney, Agent, or Firm*—Sughrue, Mion, Zinn, Macpeak & Seas

[57] ABSTRACT

An optical-fiber cable containing at least one optical member, and at least one strength member constructed such that members are inserted in respective hollow cavities within a covering made of thermoplastic. The cavities are closed relative to the outside of the cable, and all the cavities receiving optical members communicate with one another, with at least two of the cavities communicating with each other. The members contained in the cavities that communicate with each other are coated with a viscous, non-adhering coating material preventing them from adhering to the thermoplastic covering so that the covering defines a central portion having at least two branches, the central portion containing no thermoplastic and being filled with the coating material. Each branch is terminated at one of its ends by a respective cavity communicating with other cavities and having its other end joined to the other ends of the other branches.

7 Claims, 2 Drawing Sheets

EASY AND QUICK STRIPPING OPTICAL-FIBER CABLE, AND A METHOD OF MANUFACTURING SUCH A CABLE

BACKGROUND OF THE INVENTION

The present invention relates to optical-fiber cables, and more particularly it relates firstly to a cable having at least one optical member and at least one strength member, with it being easy and quick to strip the end of the cable, and secondly to a method of manufacturing such a cable.

In addition to containing one or more optical fibers, a subscriber connection optical-fiber cable generally contains one or more mechanical strength members which give the cable a certain amount of stiffness. Such strength members have low coefficients of thermal expansion so that they limit variations in the length of the cable due to temperature variations or to traction forces applied to the cable, which can also have adverse effects on the optical fibers.

For example, such a cable is described in Document U.S. Pat. No. 5,218,659. It contains a central strength member embedded in an extruded plastics covering provided with a plurality of cavities that are closed relative to the outside of the cable, and that do not communicate with one another, which cavities receive the optical fibers.

The connections to be performed at the ends of the subscriber connection cables require access to be provided to the optical fibers by removing the thermoplastic covering surrounding them. With the cable of the above-mentioned document, this is a difficult operation that is performed by using a cutting tool and that might damage the optical fibers, even if they are covered with protective coverings, if it is performed too quickly and without taking care. This operation, which is frequent in making subscriber connections, thus involves a high labor cost if connection times are long.

SUMMARY OF THE INVENTION

The main object of the invention is to provide an optical-fiber cable that can be stripped easily and quickly without any risk of damaging the optical fibers.

Another object of the invention is to provide a method of manufacturing such a cable.

To these ends, the invention provides an optical-fiber cable containing at least one optical member, and at least one strength member, the members being inserted in respective cavities in a covering made of a thermoplastic, said cavities being closed relative to the outside of the cable;

said cable being characterized in that all of the cavities receiving said optical members communicate with one another, at least two of all of said cavities communicating with each other, and in that the members contained in the cavities that communicate with one another are coated with a coating material preventing them from adhering to said covering, so that said covering defines a central portion having at least two branches, which central portion contains no thermoplastic and is filled with said coating material, each of said branches being terminated at one of its ends by a respective one of said cavities communicating with other cavities, and having its other end joined to the other ends of the other branches.

By means of the cable of the invention, and of its central portion filled with a coating material, it is no longer necessary to cut the covering facing the cavities containing the optical members in order to strip them. There is thus no risk to the optical members being damaged during stripping.

In order to strip the cable of the invention, a force can be exerted radially on the strength members, which are not fragile, thereby causing the thermoplastic to tear at the weak points in the covering that are located between the periphery of the covering and the cavities receiving the optical members.

When at least one cavity receiving a strength member communicates with other cavities, the covering can, for example, be cut off in the vicinity of the strength member quickly and without having to be very careful.

The invention thus makes stripping easy and quick.

For example, the cable may contain two optical members received in cavities that are diametrically opposite each other, and two strength members received in cavities that are diametrically opposite each other orthogonally to the cavities receiving the optical members.

In an advantageous embodiment, only those cavities which receive the optical members communicate with each other, so that the central portion is substantially I-shaped.

In another advantageous embodiment, all of the cavities communicate with one another so that the central portion is substantially in the shape of a cross.

In a method of manufacturing a cable of the invention by means of an extruder, the optical members are coated with a coating material, and then said thermoplastic is extruded, while adjusting the flow-rate of said coating material as a function of the pressure of the thermoplastic in the extruder so as to drive said coating material towards the central portion located between said cavities, and so as to hold said coating material captive in said central portion by means of the thermoplastic.

This method makes it possible to create the central portion at the center of the cable of the invention.

The aims, objects, and characteristics of the present invention appear more clearly from the following description given with reference to the accompanying drawings, in which:

DETAILED DESCRIPTION OF THE PREFERRED EMBODIMENT

Figure 1:
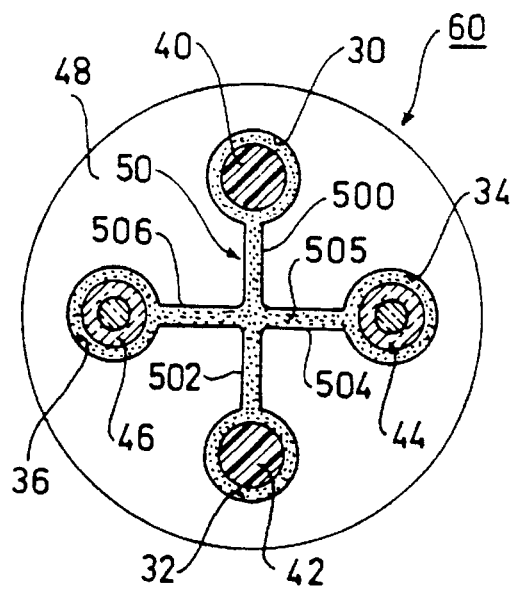
FIG. 1 is a cross-section through an optical-fiber cable of the invention.

A cross-section through a cable 60 of the invention is shown in FIG. 1. The cable 60 contains two strength members 40 and 42 and two optical fibers 44 and 46 installed inside respective cavities 30, 32, 34, 36 defined in a substantially cylindrical covering 48 of a thermoplastic. The strength members 40, 42 and the optical fibers 44, 46 are coated with a coating material 505 preventing them from adhering to the covering 48. For example, the coating material 505 may be of the petroleum jelly or silicone grease type, or more generally it is greasy and viscous, so as not to adhere to the thermoplastic of the covering 48. In particular, filler materials conventionally used in optical-fiber cables may be used.

The cavities 30 and 32 receiving the strength members 40 and 42 are diametrically opposite each other. The cavities 34 and 36 receiving the optical fibers 44 and 46 are also diametrically opposite each other along a diametrical plane that is perpendicular to that of the cavities 30 and 32. The strength members 40 and 42 face each other, as do the optical fibers 44 and 46.

In accordance with the invention, the cavities 30, 32, 34, and 36 communicate with one another so as to form a cross 50 that contains no thermoplastic, and that is filled with a coating material 505 inside the covering 48. The cross 50 thus comprises four branches 500, 502, 504 and 506. One of the ends of each of the branches is terminated by a respective cavity 30, 32, 34, and 36, and the other end is joined to the other ends of the other branches.

Figure 2:
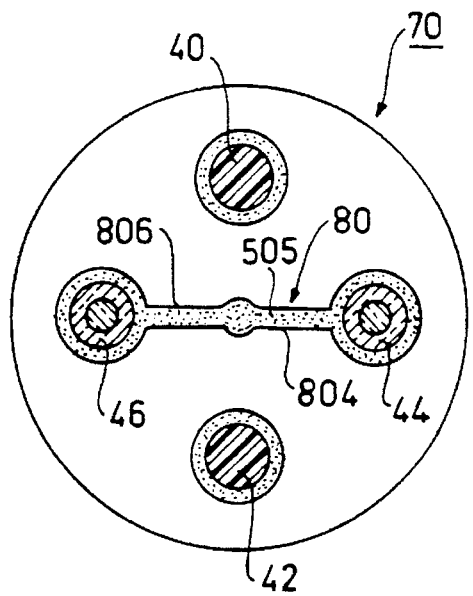
FIG. 2 is a cross-section through a second optical-fiber cable of the invention.
Figure 3:
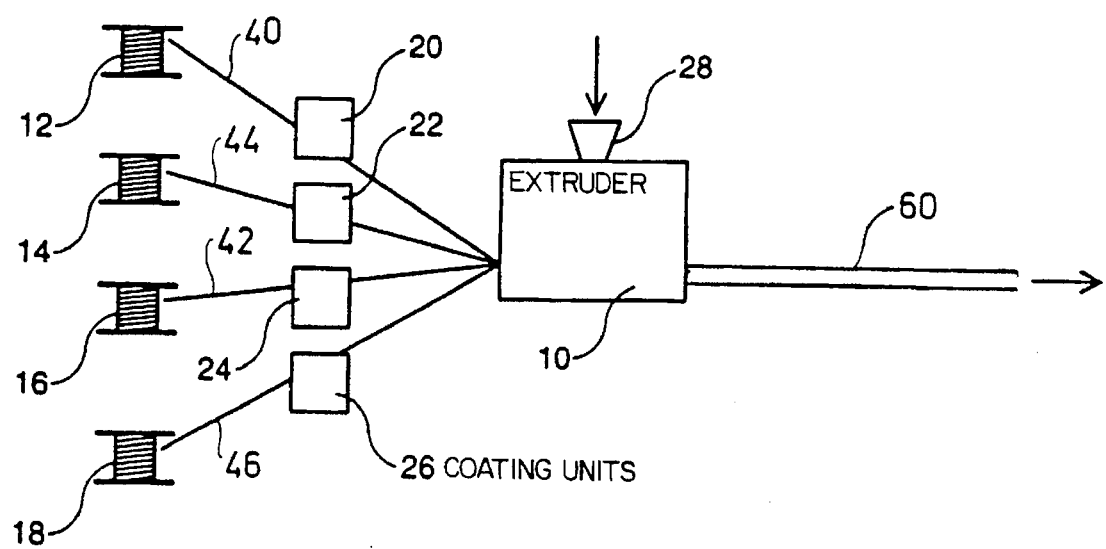
FIG. 3 is a diagram showing the installation used to manufacture the optical-fiber cable shown in FIG. 1.

FIG. 2 is a diagram showing how the cable 60 is manufactured by means of an extruder 10.

The strength members 40 and 42, and the fibers 44 and 46 are supplied to the extruder 10 from reels or paying-out stations 12, 14, 16, and 18. Prior to being inserted into the extruder 10, the strength members and the optical fibers are coated with a coating material as they pass through units 20, 22, 24, and 26.

The coated strength members and optical fibers penetrate into the extruder 10 which receives via a feed chute 28 the thermoplastic for forming the covering 48 of the cable 60. The thermoplastic in which the strength members and the optical fibers are suitably organized is extruded so as to form the cable 60 after cooling and setting.

In accordance with the invention, the flow-rate of the coating material in the units 20, 22, 24, and 26 is adjusted as a function of the pressure of the thermoplastic in the extruder 10, so that the pressure is such that the thermoplastic drives the coating material towards the planes of symmetry of the cable so as to form substantially the cross-shaped central portion 50, and holds it captive in the central portion. The coating material on the strength members and on the optical fibers thus prevents the flows of liquid thermoplastic (inside the extruder) from joining up in the center of the cable.

Thus, the central portion 50 contains no thermoplastic and it is filled with coating material 505. It therefore constitutes score lines facilitating subsequent stripping of the cable.

Once the thermoplastic has cooled, the final cross-shaped space 50 is thus formed, the ends of the space constituting the cavities receiving the strength members and the optical fibers, and the space being filled with coating material 505. The special shape taken up by the central portion 50 results from the fact that the thermoplastic penetrates uniformly into the extruder 10.

FIG. 2 shows one of the possible variants on a cable of the invention. This cable 70 contains the same members as the cable 60 shown in FIG. 1. However, only the optical fibers 44 and 46 are coated with a coating material 505, so that the central portion 80 comprises only two branches 804 and 806, and is substantially I-shaped.

The cable 70 shown in FIG. 2 may be manufactured in the same way as the cable 60 shown in FIG. 1.

Figure 4:
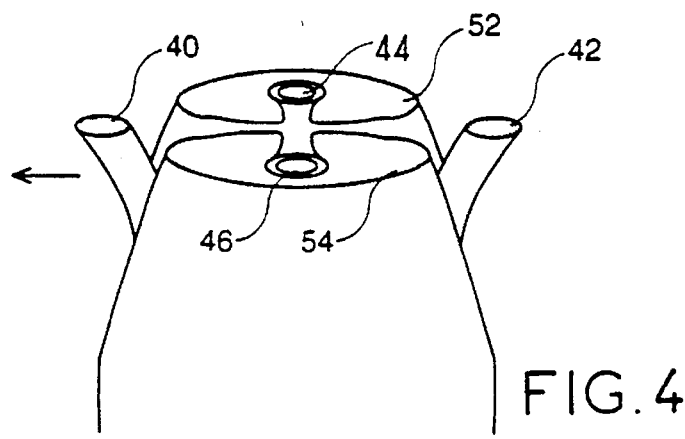
FIGS. 4, 5, and 6 show the main steps implemented to strip the optical-fiber cable shown in FIG. 1.
Figure 5:
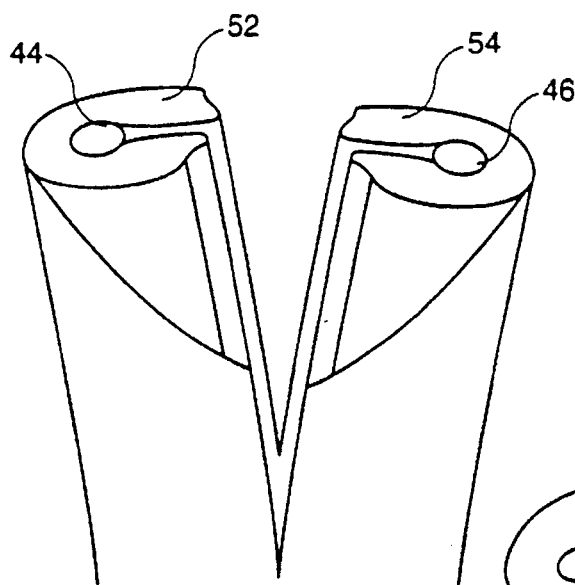
Figure 6:
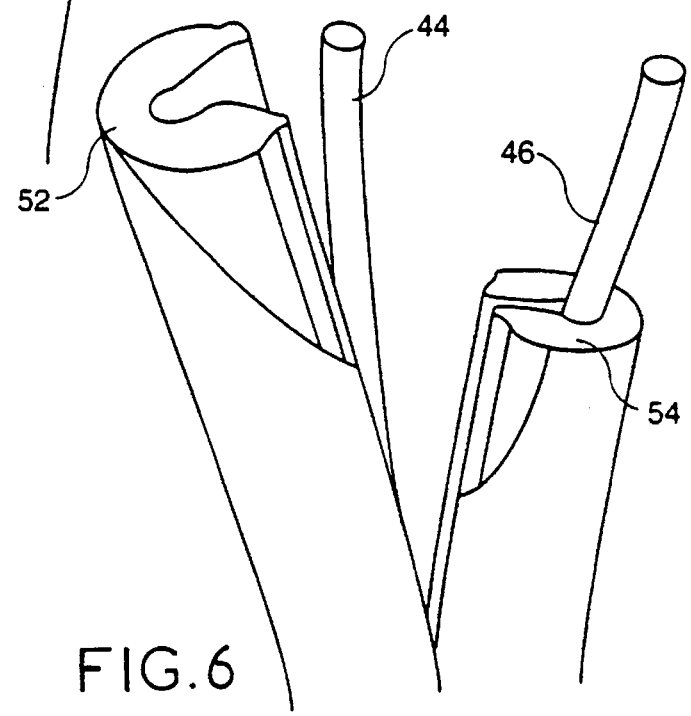

By means of the cross-shaped central portion 50, the optical-fiber cable as shown in FIG. 1 makes it possible to reduce the connection time by offering easy and quick stripping as shown in FIGS. 4, 5, and 6.

Firstly, the portions of thermoplastic covering the strength members 40 and 42 are removed by means of a cutting instrument. This poses no problem insofar as it is not necessary to be careful with the strength members. Then the strength members 40 and 42 are disengaged outwards over a length of a few centimeters, as shown in FIG. 4, thereby leaving apparent two cable portions 52 and 54.

Then, in the second step shown in FIG. 5, the walls of the cross branches 504 and 506 leading to the fibers 44 and 46 are moved apart. In this way, the portion 52 in which optical fiber 44 is located is opened so as to release the fiber 44 as shown in FIG. 6. It is then necessary merely to use a cutting instrument to remove the portion of thermoplastic from which the optical fiber has been disengaged, so as to obtain a length of optical fiber such as 46 of a few centimeters.

By means of the invention, the resulting cable having two optical fibers can be stripped easily and quickly without running the risk of damaging the optical fibers insofar as they can be disengaged from the cable without using any instrument.

Likewise, with the cable shown in FIG. 2, it is necessary merely to exert radial force on the strength members 40 and 42, thereby causing the thermoplastic of the covering 48 to tear at the weak points therein located between the cavities 34 and 36 and the periphery of the covering 48.

Although the above description concerns a cable containing two strength members and two optical fibers, it can be generalized without going beyond the ambit of the invention to any cable containing at least two members, namely at least one optical member and at least one strength member. Thus, a cable of the invention may contain one optical fiber and one strength member, two optical fibers and one strength member, or four optical fibers and two strength members, etc. However, it is important for the present invention that all of the cavities receiving the optical members (when there are more than two of them) communicate with one another, and that at least two (arbitrary) cavities communicate with each other.

Similarly, each of the cavities receiving the optical fibers may contain one or more optical fibers, or one or more ribbons of optical fibers. In order to generalize, the term "optical member" refers to an optical fiber, a set of optical fibers, a ribbon of optical fibers, or a set of such ribbons contained in a cavity of the cable of the invention.

For example, the members (optical fibers or strength members) may be disposed so as to form substantially a circle, but without the optical fibers necessarily facing one another as shown in FIG. 1. During the manufacturing method, and as mentioned above, a central portion is created that is filled with coating material and that contains no thermoplastic, which portion comprises a number of branches corresponding to the number of cavities that communicate with one another (e.g. 4 in the cable 60 shown in FIG. 1, and 2 in the cable 70 shown in FIG. 2), each of the branches being terminated by a respective member.

It should be noted that the manufacturing method of the invention may be applied not only to subscriber connection cables, but also to all "protected" cables such as overhead cables, underground cables, etc.

What is claimed is:

1. An optical-fiber cable containing at least one optical member, and at least one strength member, said members being inserted in respective cavities in a covering made of a thermoplastic, said cavities being closed relative to the outside of the cable;

said cable being characterized in that all of the cavities receiving said optical members communicate with one another, at least two of all of said cavities communicate with each other, and in that the member contained in the cavities that communicate with one another are coated with a viscous, non-adhering coating material preventing them from adhering to said covering, so that said covering defines a central portion having at least two branches, which central portion contains no thermoplastic and is filled with said viscous non-adhering coating material, each of said branches being terminated at one of its ends by a respective one of said cavities communicating with other cavities, and having its other end joined to the other ends of the other branches.

2. A cable according to claim 1, characterized in that said cable contains two optical members, and two strength members, said central portion being in the shape of a cross having four branches.

3. A cable according to claim 1, characterized in that said cable contains two optical members and two strength members, and in that only those cavities which receive the optical members communicate with each other, so that the central portion is substantially I-shaped.

4. A method of manufacturing an optical-fiber cable by means of an extruder, said cable comprising at least one optical member, and at least one strength member, said members being inserted in respective cavities in a covering made of thermoplastic, said cavities being closed relative to the outside of the cable; said cable being characterized in that all of the cavities receiving said optical members communicate with one another, at least two of all of said cavities communicate with each other, and in that the members contained in the cavities that communicate with one another are coated with a viscous, non-adhering material preventing them from adhering to said covering, said method comprising the steps of coating the optical members with said viscous, non-adhering coating material, and then extruding said thermoplastic, while adjusting the flow-rate of said viscous, non-adhering coating material as a function of the pressure of the thermoplastic in the extruder so as to drive said coating material towards the central portion located between said cavities, and so as to hold said coating material captive in said central portion by means of the thermoplastic.

5. A method of stripping the end of a cable, said cable comprising at least one optical member, and at least one strength member, said members being inserted in respective cavities in a covering made of thermoplastic, said cavities being closed relative to the outside of the cable; said cable being characterized in that all of the cavities receiving said optical members communicate with one another, at least two of all of said cavities communicate with each other, and in that the members contained in the cavities that communicate with one another are coated with a viscous, non-adhering material preventing them from adhering to said covering, said method being characterized in that it comprises the following steps:

removing the thermoplastic covering said strength member(s) over a given length of the end of the cable so as to make it possible to disengage said strength members over said given length of cable, thereby constituting cable portions that are separate over said given length;

separating said separate cable portions on either side of the central portion located between said strength members;

disengaging the ends of the optical members in each of said cable portions by moving apart the two edges of the portion that contains no thermoplastic, so that said edges no longer hold said optical members captive; and removing the thermoplastic over said given length so as to obtain stripped ends of said optical members over said given length.

6. A cable according to claim 1, characterized in that said viscous non-adhering coating material is greasy thereby preventing said members contained in said cavities from adhering to said covering.

7. A cable according to claim 1, characterized in that said respective cavities containing a strength member are diametrically opposed and said cavities containing an optical member are diametrically opposed.

* * * * *